3,476,839
PROCESS OF PRODUCING MONO- OR DIALKYL PHOSPHITES OR MIXTURES THEREOF
Herbert Jenkner, Cologne-Deutz, Germany, assignor to Chemische Fabrik Kalk G.m.b.H., Cologne-Kalk, Germany
No Drawing. Filed Dec. 2, 1966, Ser. No. 598,623
Claims priority, application Germany, Dec. 11, 1965, C 37,648
Int. Cl. C07f 9/38, 9/08, 9/02
U.S. Cl. 260—979
4 Claims

ABSTRACT OF THE DISCLOSURE

Mono- or dialkyl phosphites are produced by reacting alkyl halides, particularly, alkyl bromides and iodides, with phosphorous acid in contact with a quantity of an amine which is equimolar with respect to the hydrogen halide produced. The quantity of alkyl halide employed ranges from 1 to 2 mols per mol of phosphorous acid.

The present invention relates to an improved process for the production of mono- or dialkyl phosphites or mixtures thereof and more particularly to a process wherein phosphorus acid is reacted with an alkyl halide and an amine in the molar ratio of 1:1:1 to 1:2:2.

According to J. Remond, Revue des Produits Chimiques, 1962, pp. 313–316, dialkyl phosphites can be obtained from phosphorous trihalides and aliphatic alcohols. This reaction can be illustrated by the following equation:

$$3ROH + PX_3 \rightarrow (RO)_2P(O)H + 2HX + RX$$

in which R represents aliphatic residues and X chlorine or bromine.

The reaction is preferably carried out in the presence of an acceptor for the hydrogen halide produced, such as, for example, an amine. As can be seen from the equation, only two-thirds of the alcohols used is, in this reaction, reacted to form the desired dialkyl phosphite.

In this publication, Remond draws attention to the possibility of obtaining dialkyl phosphites by reaction of lead phosphite with alkyl iodides. This reaction has not achieved any significance, however, on an industrial scale because a considerable weight of lead has to be reacted in order to obtain a proportionately small weight of dialkyl phosphites.

Therefore, a method of producing dialkyl phosphites has been sought after which would be easily carried out on a large industrial scale with as few by-products as possible.

According to the invention it was found that alkyl phosphites could be easily produced on a large commercial scale by reacting an alkyl halide with phosphorous acid and a quantity of an amine which is equimolar with the hydrogen halide produced.

The method according to the invention can be represented by the following equations:

$$2RX + (OH)_2P(O)H + 2(R')_3N \rightarrow (RO)_2P(O)H + 2(R')_3N \cdot HX$$

$$RX + (HO)_2P(O)H + (R')_3N \rightarrow (RO)(OH)P(O)H + R'_3N \cdot HX$$

in which RX represents the alkyl halides defined in greater detail hereinafter and $R'_3N$ the amines.

As compared with the known method which is based on alcohols, phosphorus trihalide and amine, the method according to the invention permits a saving of ⅓ mol each of alkyl compound and halide. In addition, the phosphorous acid which is to be used in the method according to the invention can be handled substantially more easily than the phosphorus trihalides which are very sensitive to moisture and which have a markedly corrosive action.

Primary, secondary and tertiary alkyl halides, substituted if need be by ether, ester, hydroxyl or cyano groups can be used for the process according to the invention. The alkyl halides are preferably used in the form of their bromides or even iodides. Alkyl halides such as methyl, ethyl, butyl, cyclohexyl and octyl bromide have proved particularly suitable. Of the alkyl chlorides only particularly activated forms, such as, for example, tertiary butyl chloride, can be considered.

Phosphorous acid can be used as such or diluted with water. Particularly suitable is an acid containing more than 95% weight phosphorous acid.

As amines, it is preferable to use tertiary amines. However, secondary or primary amines can also be used instead or together with the tertiary amines. Examples of amines which should be preferably used are: trimethylamine, triethylamine, dibutylethylamine, triallylamine, cyclohexyldimethylamine, pyridine, N-methylmorpholine. The individually most favourable combination of alkyl halide and amine can easily be ascertained by simple preliminary experiments.

In order to carry out the method according to the invention, the amine and the alkyl halide are mixed together, preferably with the addition of a solvent or diluent. The relevant alkyl halide, the dialkyl phosphite to be produced or aliphatic, cycloaliphatic or aromatic hydrocarbons or mixtures thereof may be used as solvents or diluents. The solvent is used in such quantities that the reaction mixture remains readily stirrable throughout the entire progress of the reaction. It has been found that, for example, 100 to 800 cc. solvent per mol of alkyl halide may be adequate. The mixture of the alkyl halide, amine and, if applicable, solvent is first heated to temperatures of 60 to 100° C. Then, the necessary quantity of phosphorous acid is slowly added to the mixture.

To produce dialkyl phosphites, alkyl halide, phosphorous acid and amine are used in the molar ratio of 2:1:2. In order to obtain mono alkyl phosphites or mixtures of mono and dialkyl phosphites, correspondingly reduced quantities of alkyl halide and amine are used. The range of molar ratios therefore is between 2:1:2 and 1:1:1.

The reaction according to the invention starts upon the addition of the phosphorous acid with the separation of the amine hydrohalide. A short time after the full quantity of phosphorous acid has been added, the reaction mixture is allowed to cool and the amine hydrohalide separated off. The amine can be recovered from the latter by splitting off hydrogen halide therefrom using known methods and re-used in the process. The alkyl phosphite left after separation of the amine hydrohalide is distilled at reduced pressure.

According to the invention, it is possible to produce alkyl phosphites in yields of approximately 90 to 95% of the theory in a process which is easily implemented industrially.

The method according to the invention will be described in greater detail hereinafter with reference to an example which implies no limitation.

EXAMPLE 300 parts by weight butyl bromide, 202 parts by weight triethyl amine and 400 parts by weight toluene are mixed to form a clear solution and heated to 80 to 85° C. Within 20 minutes, 85 parts by weight of a 98% phosphorous acid are slowly added, triethyl amine hydrobromide being separated off. Upon completion of the reaction and cooling of the reaction mixture, the triethylamine hydrobromide is separated off by filtration.

The triethylamine hydrobromide is washed once with toluene to remove any clinging dibutyl phosphite. After drying, 350 parts by weight triethylamine hydrobromide are obtained. The toluene solutions are combined and the toluene removed by distillation. The dibutyl phosphite is then distilled at 120 to 125° C. at a pressure of 12 mm. Hg. The yield of dibutyl phosphite amounts to 176 parts by weight, which is 91% of the theory.

I claim:

1. A process of producing mono- or dialkyl phosphites comprising reacting phosphorous acid with an alkyl chloride, bromide or iodide having 1–8 carbon atoms and a lower alkyl amine, an allyl amine, a cycloalkyl amine or a heterocyclic amine in an amount substantially equimolar with the resultant hydrogen halide.

2. The process of claim 1 wherein the phosphorous acid, alkyl halide and amine are reacted in the molar ratio of substantially 2:1:2 to 1:1:1.

3. The process of claim 1 wherein the alkyl halide is a bromide and the amine is a tertiary lower alkyl amine, triallylamine, cyclohexyldimethylamine, pyridine or N-methylmorpholine.

4. The process of claim 1 wherein butyl bromide and triethylamine are dissolved in a solvent and phosphorous acid is slowly added thereto, then the triethylamine hydrobromide is separated out and the dibutyl phosphite is distilled off.

References Cited

UNITED STATES PATENTS 3,086,974   4/1963   Schlor et al. _____ 260—979 X

CHARLES B. PARKER, Primary Examiner
R. L. RAYMOND, Assistant Examiner